(12) United States Patent
Kritler et al.

(10) Patent No.: US 6,904,226 B2
(45) Date of Patent: Jun. 7, 2005

(54) APPARATUS AND METHOD FOR PREPARING A COATED OPTICAL FIBER

(76) Inventors: David A. Kritler, 17140 Hofer Ct., Lake Oswego, OR (US) 97034; Warren R. Hill, 1856 SW. Edgewood Rd., Portland, OR (US) 97201; Frederic Campbell Schildmeyer, 2175 SW. Kings Ct., Portland, OR (US) 97205; Christiaan Johannes Brokke, 1218 SE. Jacquelin Dr., Hillsboro, OR (US) 97123; Francis Martin Ernest Sladen, 66 Murray Dr., Hillsborough, NJ (US) 08844; Damien Slevin, 205 Lakepoint Pl. North, Apt. 204, Keizer, OR (US) 97303; John W. Dyer, 5 Northam Dr., Dover, NH (US) 03820

(*) Notice: Subject to any disclaimer, the term of this patent is extended or adjusted under 35 U.S.C. 154(b) by 411 days.

(21) Appl. No.: 10/098,582

(22) Filed: Mar. 15, 2002

(65) Prior Publication Data

US 2002/0145731 A1 Oct. 10, 2002

Related U.S. Application Data

(63) Continuation-in-part of application No. 10/055,165, filed on Jan. 21, 2002.
(60) Provisional application No. 60/276,393, filed on Mar. 16, 2001.

(51) Int. Cl.$^7$ .............................................. G02B 6/00
(52) U.S. Cl. ..................... 385/147; 385/137; 385/128; 356/73.1; 134/1; 83/14
(58) Field of Search ........................... 385/50, 52, 76, 385/88, 147, 137, 123, 126, 127, 128; 356/73.1; 134/1, 1.1; 83/14; 264/1.24; 350/96.2, 96.22, 96.21; 81/9.51; 29/566.3, 564.4, 564.8, 566.1; 225/96, 96.5; 427/163.2

(56) References Cited

U.S. PATENT DOCUMENTS

| 5,235,664 | A | * | 8/1993 | Okada et al. ................ 385/134 |
| 5,253,412 | A | * | 10/1993 | Fukuoka et al. ........... 29/566.3 |
| 5,469,611 | A | * | 11/1995 | Sasaki et al. ............... 29/426.2 |
| 5,524,167 | A | * | 6/1996 | Ewert et al. ................. 385/137 |
| 6,337,943 | B1 | * | 1/2002 | Dumitriu ..................... 385/137 |
| 6,628,879 | B2 | * | 9/2003 | Robinson et al. ........... 385/134 |
| 6,695,191 | B1 | * | 2/2004 | Tabeling ...................... 225/95 |

FOREIGN PATENT DOCUMENTS

EP 0 509 737 * 10/1992 ............ G02B/6/25

* cited by examiner

Primary Examiner—Frank G. Font
Assistant Examiner—James P. Hughes
(74) Attorney, Agent, or Firm—John Smith-Hill; Smith-Hill and Bedell

(57) ABSTRACT

A method of preparing a coated optical fiber for coupling to a face of an optical device includes placing the coated fiber so that it extends through a stripping station, a cleaning station and a cleaving station. A stripper at the stripping station is brought into engagement with the fiber and relative motion between the fiber and the stripping station, the cleaning station and the cleaving station is effected lengthwise of the fiber, whereby the coating is stripped from a medial length segment of the fiber as the cleaning device at the cleaning station is activated for cleaning fragments of coating material from the medial length segment of the fiber as the medial length segment passes through the cleaning station and the cleaning device is deactivated and stripping is discontinued. The fiber is positioned with the medial length segment at the cleaving station, the fiber is clamped at a location that is upstream of the cleaving station with respect to the direction from the stripping station to the cleaving station, and the fiber is cleaved within the medial length segment, thereby providing the fiber with a freshly cleaved end region.

17 Claims, 10 Drawing Sheets

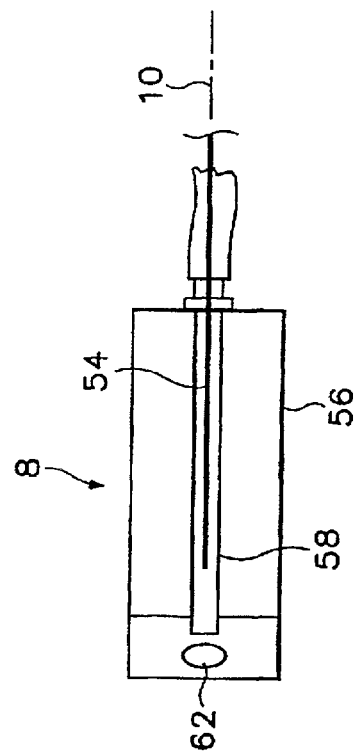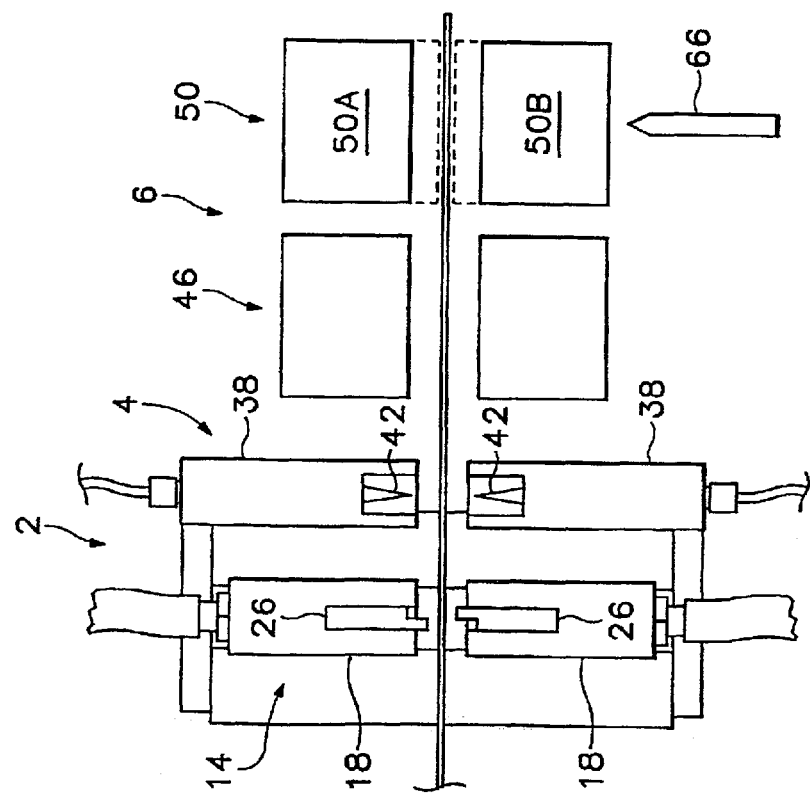
FIG.1

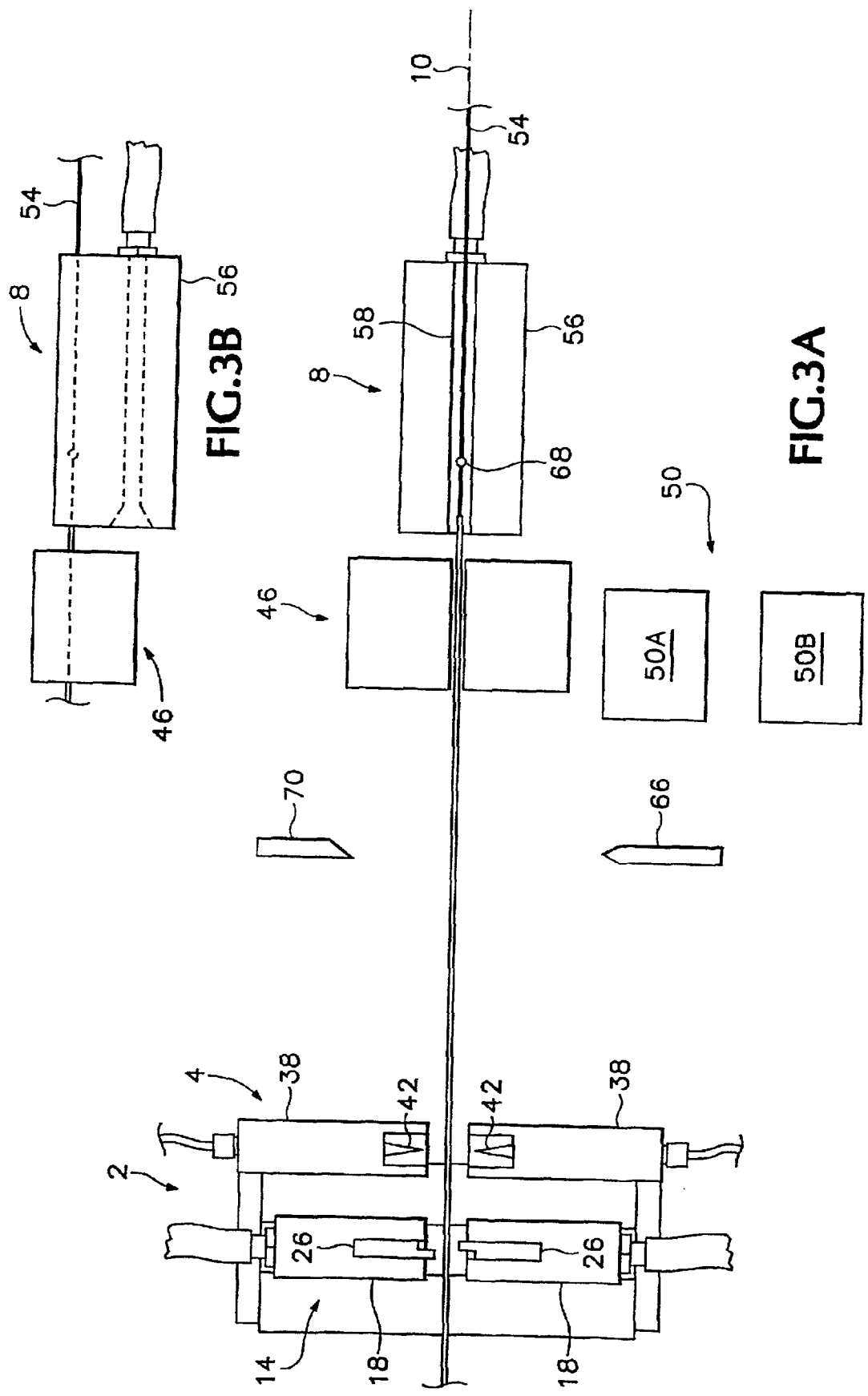

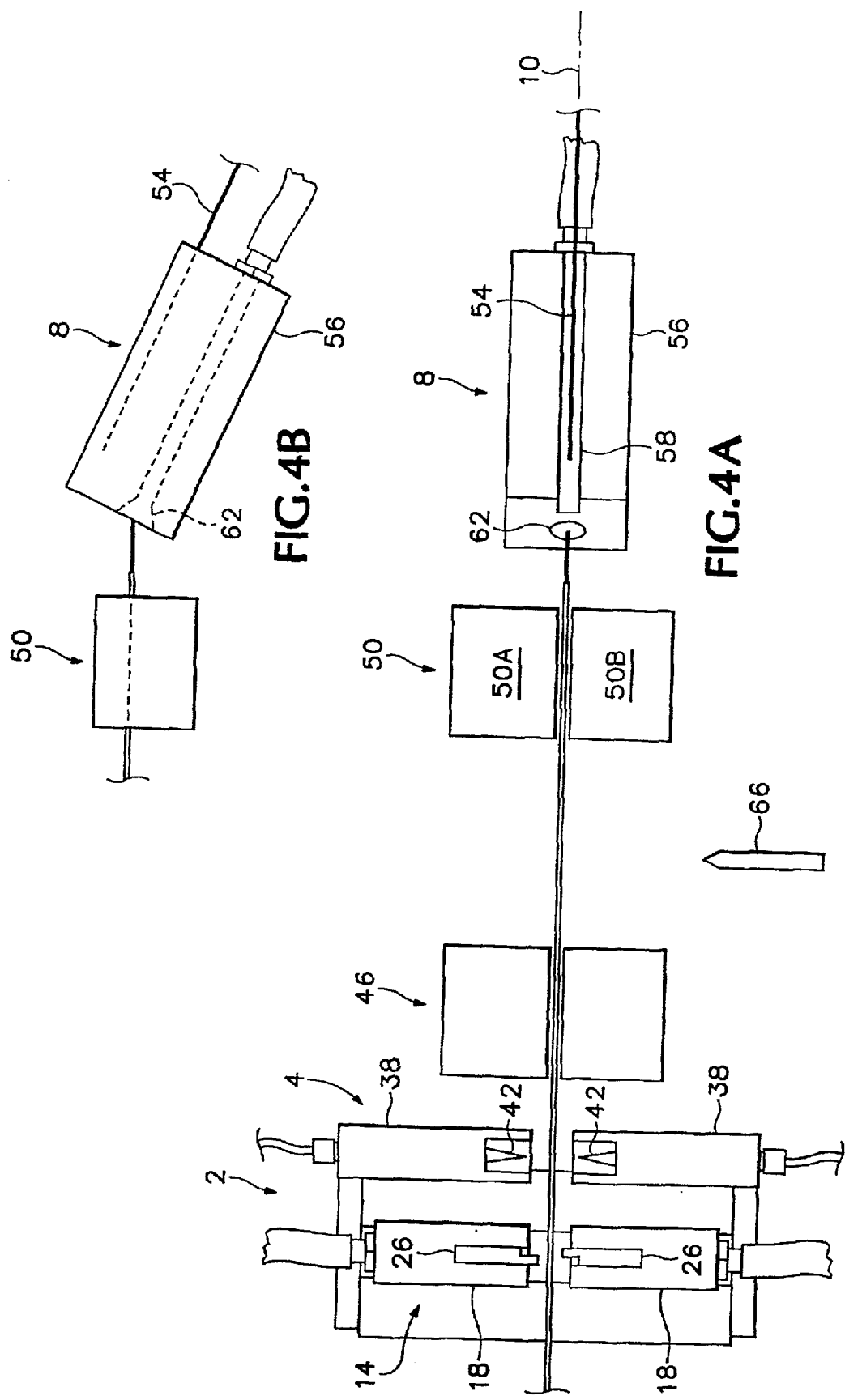

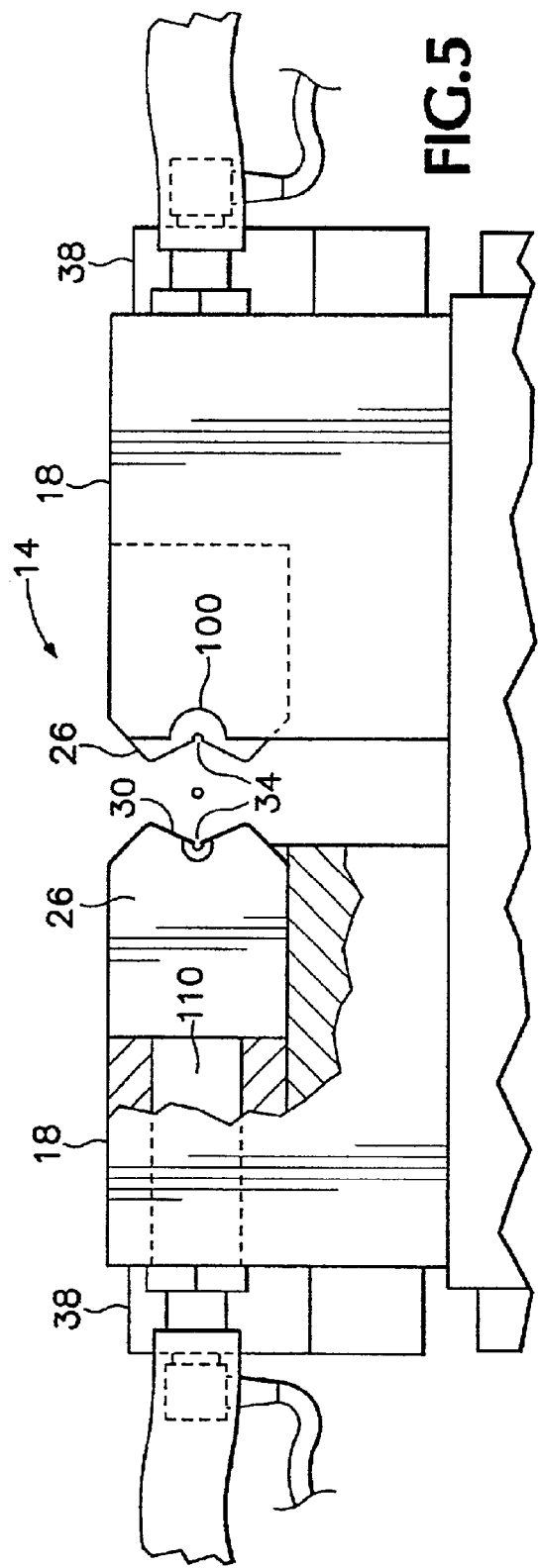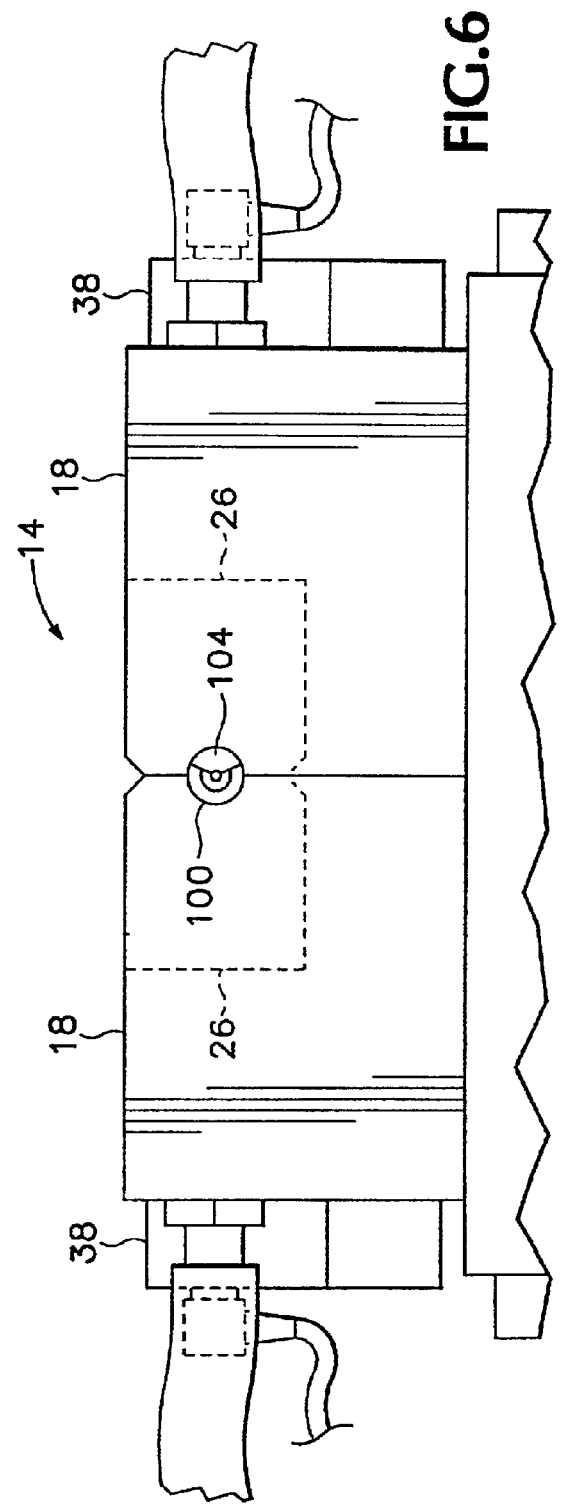

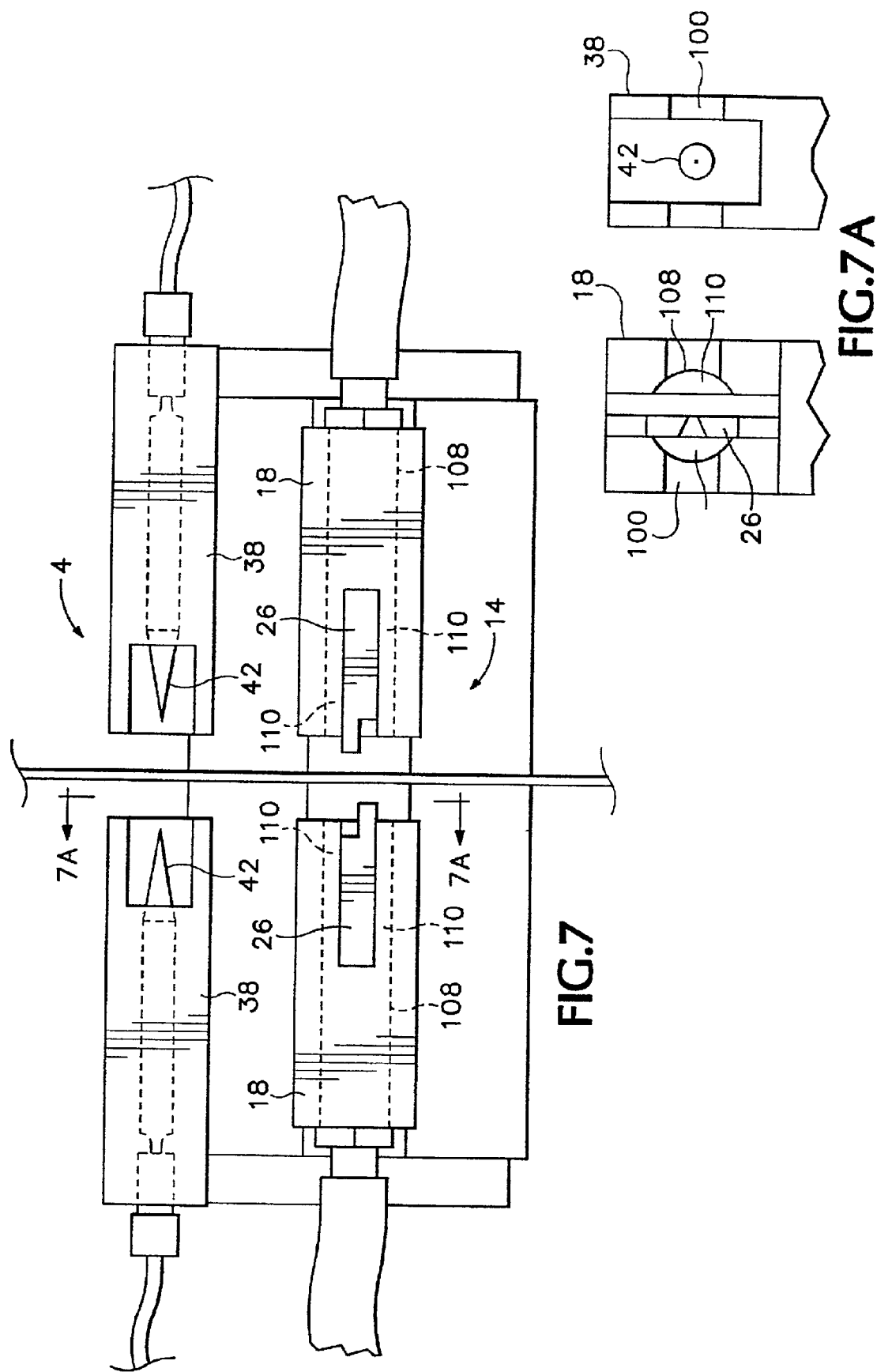

APPARATUS AND METHOD FOR PREPARING A COATED OPTICAL FIBER

CROSS-REFERENCE TO RELATED APPLICATIONS

This application claims benefit of Provisional Application No. 60/276,393 filed Mar. 16, 2001, the entire disclosure of which is hereby incorporated by reference herein for all purposes.

This application is filed as a continuation-in-part of co-pending patent application Ser. No. 10/055,165 filed Jan. 21, 2002, the entire disclosure of which is hereby incorporated by reference herein for all purposes.

BACKGROUND OF THE INVENTION

This invention relates to an apparatus and method for preparing a coated optical fiber for coupling at a free end to an optical face.

A conventional optical fiber comprises a core, a cladding and a protective coating. The coating that is conventionally used on optical fiber is a UV curable polymer material. The mechanical nature of the coating depends on the conditions to which it has been exposed, particularly the extent to which is has been exposed to UV radiation.

In making measurements on a optical fiber, it may be necessary to couple an end face of the fiber under test (the "test fiber") to an optical fiber test or measurement instrument, such as an optical fiber time domain reflectometer (OTDR), through a buffer fiber. In order to provide a satisfactory optical coupling between the test fiber and the buffer fiber, an end segment of the test fiber may be brought into axial alignment with an end segment of the buffer fiber using a fiber aligner. A suitable fiber aligner is described in U.S. Pat. No. 5,949,938.

The aligner that is described in U.S. Pat. No. 5,949,938 is specifically designed for aligning a single mode test fiber with a similar single mode buffer fiber. Because single mode fiber cores are very thin, a single mode fiber must be aligned with a high degree of precision. Because the coating of the fiber may not have a precise geometrical relationship with the core, it is necessary to strip the coating from the end segment of the test fiber before placing it in the aligner, which then uses the cladding surfaces to align the cores. It is possible to strip some coatings using chemical solvents, but in an industrial setting, the use of these solvents is not desirable when considering issues relating to environment and safety. When the coating of a conventional optical fiber is mechanically stripped, the coating material does not usually remain in the form of a sleeve or tube that slides off the end of the fiber but, on the contrary, the coating breaks up into discrete conglomerates and particles. These particles and other debris must be removed from the end segment of the fiber since they could interfere with proper positioning of the end segment of the fiber in the aligner.

U.S. Pat. No. 5,949,938 discloses a technique in which an operator manually strips an end segment of the test fiber, fits the test fiber in a fiber clip and then manually cleaves the test fiber. The operator then manually advances the test fiber so that the cleaved end face is positioned in the aligner in contact, and in alignment, with the buffer fiber. This technique is well suited for low volume work because it does not require expensive fiber handling equipment, but its reliance on operator time and skill limits its efficiency and makes it less than optimum for high volume use.

The conventional mechanical technique for stripping an optical fiber involves placing the end segment of the fiber in a stripper, closing the stripping blades about the fiber close to the end face of the fiber, and then drawing the end segment of the fiber through the stripping blades, so that the stripping blades pass along the fiber in the direction towards the end face of the fiber.

When the coating is stripped from an optical fiber, a high electrostatic charge is generated on the exposed surface of the fiber cladding. The electrostatic charge may attract particles of coating material, dust and debris. These particles must be removed before the fiber is placed in the fiber aligner, since otherwise they could interfere with alignment of the fiber. In principle, it would be possible to remove particles from the surface of the cladding by wiping, but wiping itself tends to create an electrostatic charge and so even though the wiping may be effective to remove larger particles of cladding material, dust particles in the ambient air may be attracted to the exposed surface of the cladding.

It is known to use an electric arc to clean the cladding of an optical fiber. The electric arc vaporizes small particles (smaller than about 50 $\mu$m) adhering to the cladding so that the cladding and the end face of the fiber are in pristine condition.

SUMMARY OF THE INVENTION

In accordance with a first aspect of the invention there is provided a method of preparing a coated optical fiber for coupling to a face of an optical device, comprising (a) placing the coated fiber so that it extends through a stripping station, a cleaning station and a cleaving station, (b) bringing a stripper at the stripping station into engagement with the fiber, (c) effecting relative motion between the fiber and the stripping station, the cleaning station and the cleaving station lengthwise of the fiber, whereby the coating is stripped from a medial length segment of the fiber as said medial length segment passes through the stripping station, (d) activating a cleaning device at the cleaning station and thereby cleaning fragments of coating material from said medial length segment of the fiber as said medial length segment passes through the cleaning station, (e) deactivating the cleaning device and discontinuing stripping, (f) positioning the fiber with said medial length segment of fiber at the cleaving station, and (g) cleaving the fiber within said medial length segment, thereby providing the fiber with a freshly cleaved end region.

In accordance with a second aspect of the invention there is provided apparatus for preparing a coated optical fiber for coupling to a face of an optical device, said apparatus comprising a stripper at a stripping station, a cleaner at a cleaning station, a cleaver at a cleaving station, at least one clamp for selectively gripping a free end region of a fiber that extends though the stripping station, the cleaning station and the cleaving station, and a control means for controlling the apparatus to perform the following operations activate the clamp to grip the free end region of the fiber, activate the stripper to engage the fiber, move the clamp in a direction to apply tension to the fiber to pull the fiber through the stripping station and strip coating material from a medial length segment of the fiber, activate the cleaning device and thereby clean fragments of coating material from said medial length segment of the fiber as said medial length segment passes through the cleaning station, deactivate the cleaning device, continue to move the clamp in said direction until said medial length segment of fiber is at the cleaving station, apply tension to the medial length segment of the fiber, while the medial length segment of the fiber is under tension, cleaving the fiber within said medial length segment, thereby providing the fiber with a freshly cleaved end region, and move the clamp in said direction to advance the freshly cleaved end region of the fiber to a coupling station.

In accordance with a third aspect of the invention there is provided a stripper for stripping coating material from a an optical fiber, the stripper comprising first and second jaws, each jaw including a jaw body defining a recess and each jaw also including a blade mounted in the recess, and a means for mounting the first and second jaws in a manner allowing relative movement of the jaws between a closed position, in which the recesses cooperate to form a chamber and the jaws are positioned for stripping a fiber extending through the chamber, and an open position, in which a fiber can be placed between the jaws or removed from between the jaws without engaging the blades, and wherein at least one of the jaws includes a nozzle means opening into the recess for inducing a flow of gas in the chamber when the jaws are in the closed position, for removing particles of coating material from the fiber.

In accordance with a fourth aspect of the invention there is provided a method of preparing a length segment of optical fiber, comprising employing a first gripping element to grip the length segment at a first location, employing a second gripping element to grip the length segment at a second location, spaced from the first location, urging the second gripping element away from the first gripping element, and employing a strain gauge to generate a strain gauge signal that depends on tension in the fiber between the first and second gripping elements.

In accordance with a fifth aspect of the invention there is provided apparatus for preparing a length segment of optical fiber, comprising a first gripping element for gripping the length segment at a first location, a second gripping element for gripping the length segment at a second location, spaced from the first location, an actuator for urging the second gripping element away from the first gripping element, and a strain gauge for generating a strain gauge signal that depends on tension in the fiber between the first and second gripping elements.

In accordance with a sixth aspect of the invention there is provided apparatus for preparing a length segment of fiber, comprising a fiber guide for guiding a loose end segment of fiber in a direction transverse of its length towards a gripping location, and at least one gripping element at the gripping location for gripping the loose end segment.

In accordance with a seventh aspect of the invention there is provided apparatus for cleaving a length segment of optical fiber, comprising a first clamp for gripping the length segment at a first location, a second clamp for gripping the length segment at a second location, spaced from the first location, an actuator for urging the second clamp away from the first clamp to tension the fiber segment between the first and second clamps, a cleaving element, a translation means for moving the cleaving element between a first location, in which it is spaced from the fiber segment, and a second location, in which it contacts a fiber segment held under tension between the first and second clamps, and an acoustic means for vibrating the cleaving element and inducing a fracture in the fiber segment when the cleaving element is in the second location.

In accordance with an eighth aspect of the invention there is provided apparatus for cleaving a length segment of optical fiber, comprising a first clamp for gripping the length segment at a first location, a second clamp for gripping the length segment at a second location, spaced from the first location, an actuator for urging the second clamp away from the first clamp to tension the fiber segment between the first and second clamps, a strain gauge for generating a strain gauge signal that depends on tension in the fiber between the first and second gripping elements, a cleaving element, a translation means for moving the cleaving element between a first location, in which it is spaced from the fiber segment, and a second location, in which it contacts a fiber segment held under tension between the first and second clamps, a control means responsive to the strain gauge signal for inhibiting the translation means from moving the cleaving element to the second location unless the strain gauge signal is in a selected magnitude range.

In accordance with a ninth aspect of the invention there is provided apparatus for preparing a length segment of optical fiber, comprising an intake means for receiving the length segment, a tool that acts on the length segment in preparing the length segment and, in so doing, creates fiber debris, a debris container, a duct leading from the vicinity of the tool to the debris container, and a vacuum pump connected to the container for inducing a flow of air through the duct for carrying fiber debris into the container.

BRIEF DESCRIPTION OF THE DRAWINGS

For a better understanding of the invention, and to show how the same may be carried into effect, reference will now be made, by way of example, to the accompanying drawings, in which FIG. 1 is a schematic top plan view of apparatus for preparing single mode optical fibers for testing in its initial operating condition, FIGS. 3B and 4B are partial side elevations of the apparatus at the stages of operation shown in FIGS. 3A and 4A respectively, FIG. 5 is an enlarged end view of a combined stripper and electric arc cleaner that forms part of the apparatus shown in FIG. 1, illustrated in an open condition, FIG. 6 is a similar view of the combined stripper and arc cleaner in a closed condition, FIG. 7 is a top plan view of the combined stripper and arc cleaner in the open condition, FIG. 7A is a sectional view taken on the line A–A of FIG. 7.

DETAILED DESCRIPTION

Figure 1A:
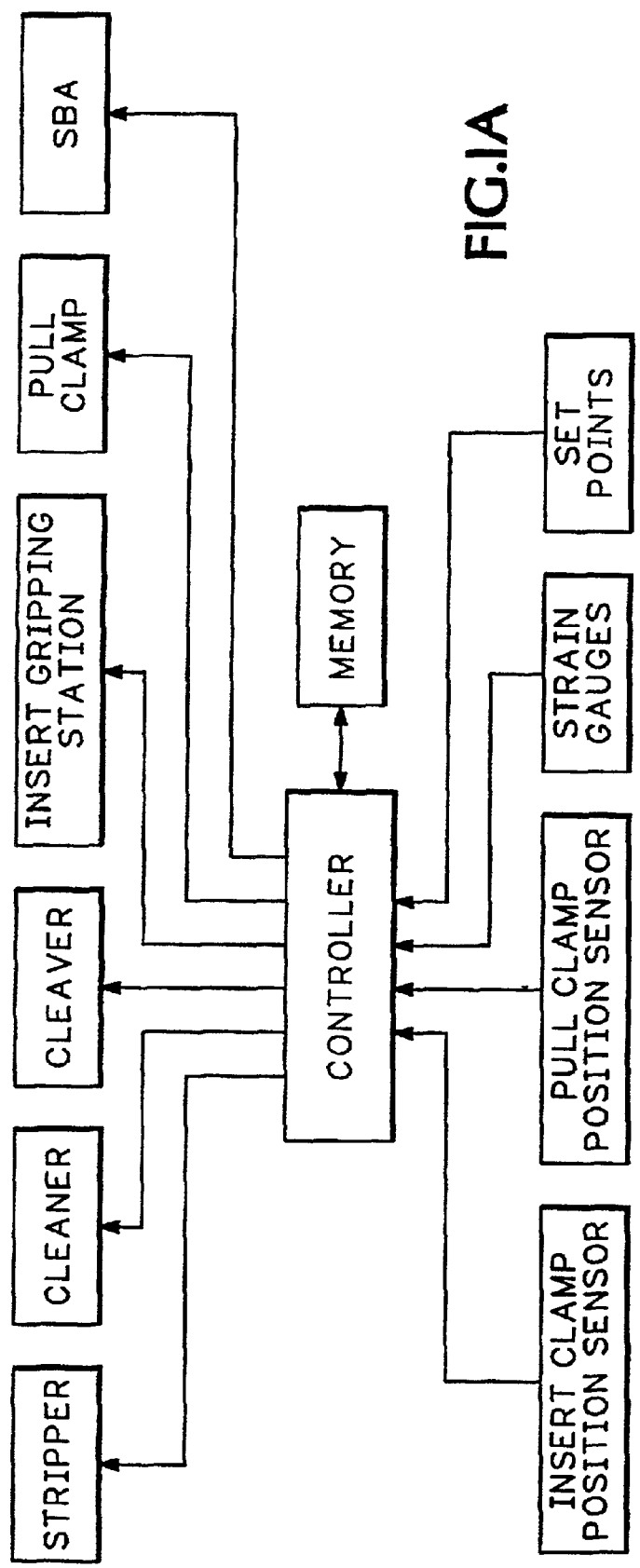
FIG. 1A is a simplified schematic block diagram of the apparatus of FIG. 1.
Figure 1B:
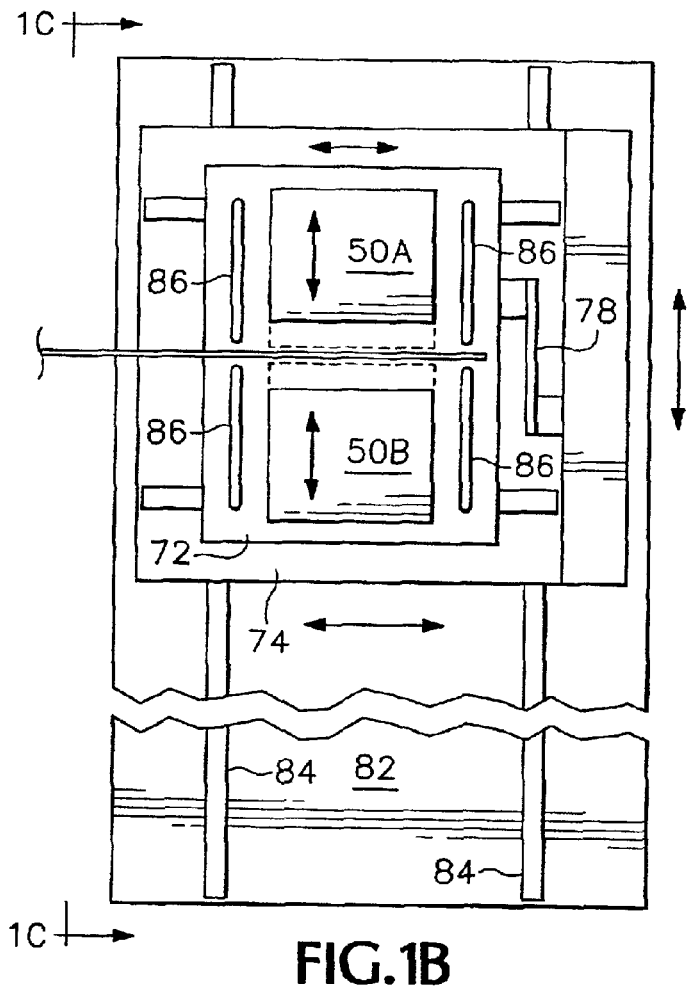
FIG. 1B is a more detailed top plan view of a part of the apparatus shown in FIG. 1.

The apparatus illustrated in the drawings is used to prepare coated single mode optical fibers for testing. Referring to FIG. 1, the apparatus has a stripping station 2, a cleaning station 4, a gripping station 6 and a coupling station 8 distributed along a horizontal (Z) axis 10. In use of the apparatus, a length segment of a test fiber is placed in the apparatus so that it is disposed along the axis 10 and its free end is just beyond the gripping station.

A controller 12 (FIG. 1A) controls the sequence of operation of the mechanisms at the stations 2–8 in response to input signals from various sensors.

Figure 8:
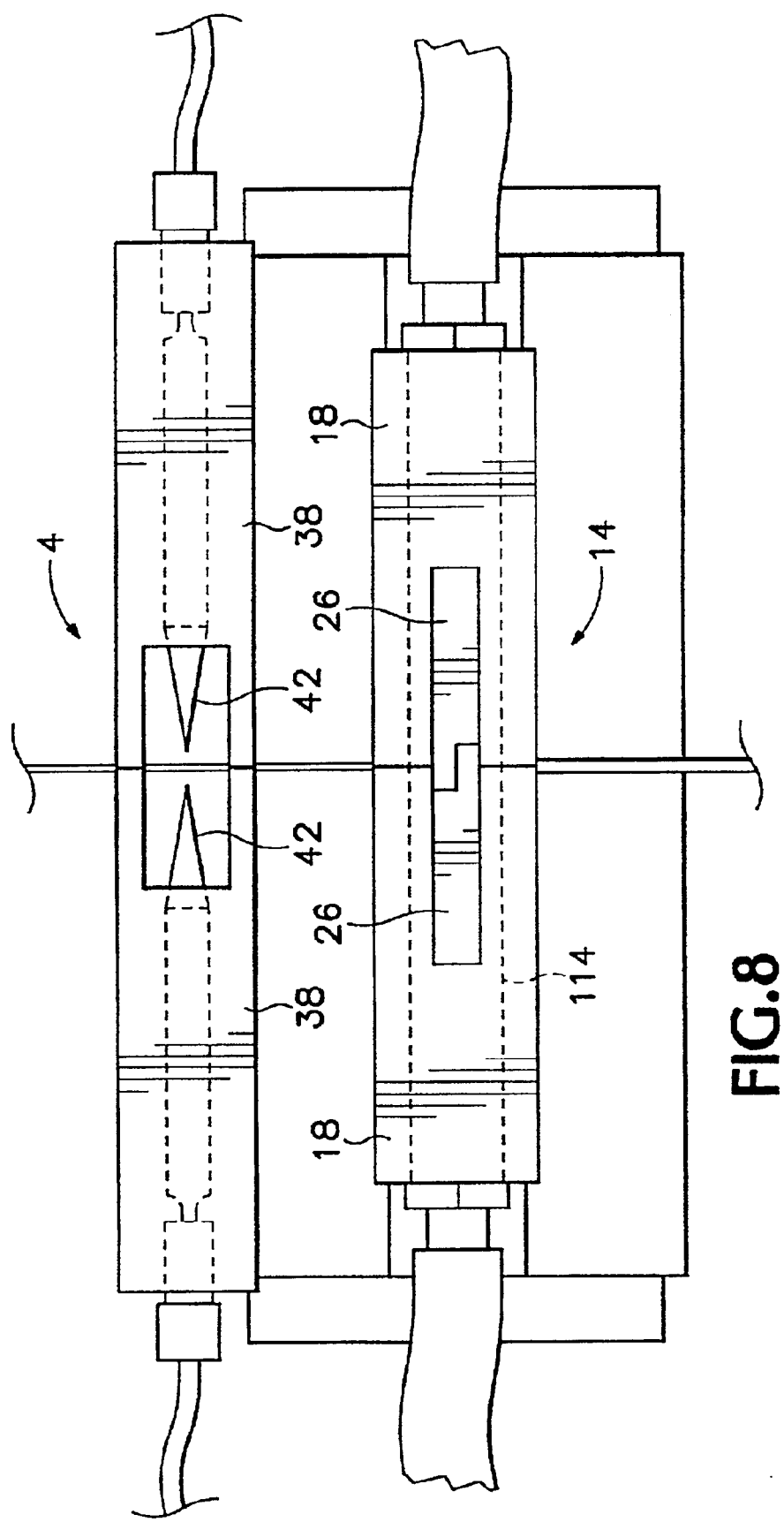
FIG. 8 is a top plan view of the combined stripper and arc cleaner in the closed condition.
Figure 9:
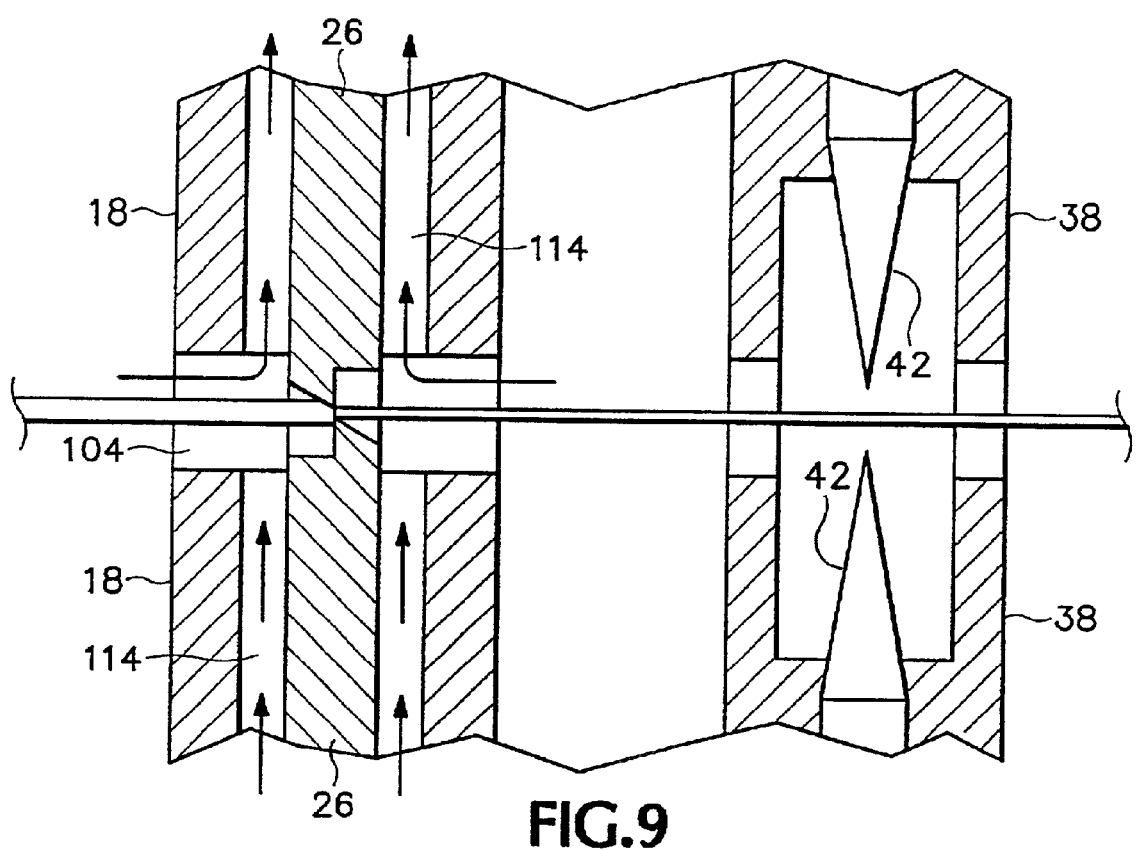
FIG. 9 is a horizontal sectional view of the combined stripper and arc cleaner.

Referring again to FIG. 1, the stripping station contains a stripper 14 composed of two jaws 18 and an actuation mechanism for driving the jaws horizontally, perpendicular to the axis 10, between a closed position (FIG. 6) and an open position (FIG. 5). Each stripper jaw includes a stripping blade 26. The blade has a tip that includes a V-shaped guide 30 leading to a semicircular notch 34 for receiving the fiber. The tips of the blades are offset along the axis 10 (see FIGS. 7–9), so that the tips are in shearing relationship when the jaws close. However, the notches 34 do not bypass each other but rather close to a diameter that is nominally slightly larger than the fiber. In the closed position, the stripping blades engage the coating of the fiber and in the open position, the fiber, with or without its coating, is able to move between the jaws without obstruction.

The cleaning station 4 contains an arc cleaner 38 which includes two electrodes 42 spaced apart across the axis 10 and at a distance L1 along the axis 10 from the stripping blades. The electrodes are attached to the stripper jaws respectively. When the stripper jaws are closed, the electrodes are at a distance of about 1.3 to 2.5 mm. The electrodes are connected to a series arrangement of a voltage source and a control switch. When the control switch is closed, the voltage source establishes a voltage of about 12 kv between the two electrodes 42. When the stripper jaws are closed, the electric field between the electrodes is sufficient to ionize the air between the electrodes and create an arc. The voltage source is provided with a current limiter for limiting current supplied to the arc.

At the gripping station 6 there is an insert clamp 46 and a pull clamp 50. Each clamp includes a base, two jaws mounted on the base, and a mechanism for driving the jaws relative to the base between a closed position and an open position. The pull clamp and the insert clamp each employ in their jaws a conventional fiber holder for gripping the fiber without bending the fiber.

The base of the insert clamp 46 is mounted on a Z-axis stage which is driven by a lead screw mechanism (not shown) for displacing the clamp 46 along the axis 10. The base 72 of the pull clamp 50 is mounted on an X-axis stage 74 (FIGS. 1B and 1C) in a manner that allows a limited range of horizontal movement of the base 72 relative to the X-axis stage 74 parallel to the axis 10. The base 72 is restrained relative to the X-axis stage 74 by a beam 78 connected at one end to the base 72 and at its other end to the stage 74. Movement of the base 72 in the upstream direction relative to the X-axis stage 74 is accompanied by deflection of the beam 78. The beam 78 carries four resistive strain gauges which are connected in a bridge circuit that generates a force signal of which the voltage depends on the deflection of the beam 78, which depends in turn on the force that is applied to the base 72 to effect movement of the base 72 relative to the stage 74. The X-axis stage 74 is mounted on a Z-axis stage 82. The X-axis stage 74 is moveable horizontally relative to the Z-axis stage 82 along guides 84 perpendicular to the axis 10 by a double acting pneumatic cylinder (not shown).

A lead screw mechanism (not shown) is operative for displacing the Z-axis stage 82 along the axis 10. The two-axis stage 74, 82 allows horizontal movement of the pull clamp 50 parallel to the axis 10 and perpendicular to the axis 10. Sensors (FIG. 1A) detect the position of each clamp along the axis 10 and provide position signals representing the positions of the clamps to the controller 12.

The base 72 of the pull clamp 50 is formed with four pairs of bores that are open upwards. Each pair of bores can receive the two opposite ends of a wire fiber guide 86. Two fiber guides can be installed on the base 72 upstream of the clamp jaws 50A and 50B and two fiber guides can be installed downstream of the clamp jaws 50A and 50B. Each fiber guide 86 has two outer, longer legs, two inner, shorter legs and a rail that connects the upper ends of the inner and outer legs and slopes downwards towards the desired position of the fiber.

The coupling station 8 is provided with a single fiber aligner, which is shown in simplified form in the drawings. In practice, the single fiber aligner, or SFA, may be similar to the aligner that is disclosed in U.S. Pat. No. 5,949,938. The aligner is used to align a free end segment of the test fiber with an end segment of a buffer fiber 54, which is connected at its other end (not shown) to a test instrument. The aligner includes a base 56 that is formed with an alignment groove 58 and can be pivoted about a horizontal axis perpendicular to the axis 10 by a pneumatic cylinder between an extraction position (FIGS. 1, 2, 4A and 4B) and an alignment position (FIGS. 3A and 3B). The base is formed with a port 62 connected by a control valve to a collection vessel. A vacuum pump exhausts air from the collection vessel and accordingly a flow of air is induced into the collection vessel by way of the port 62 when the control valve is open. The control valve is open when the base 56 is in the extraction position and is closed when the base is in the alignment position.

The strain gauge signal is provided as one of the inputs to the controller 12. The controller 12 compares the voltage of the strain gauge signal with a set point value and generates an output signal in the event that the voltage of the strain gauge signal exceeds the set point value.

Figure 1C:
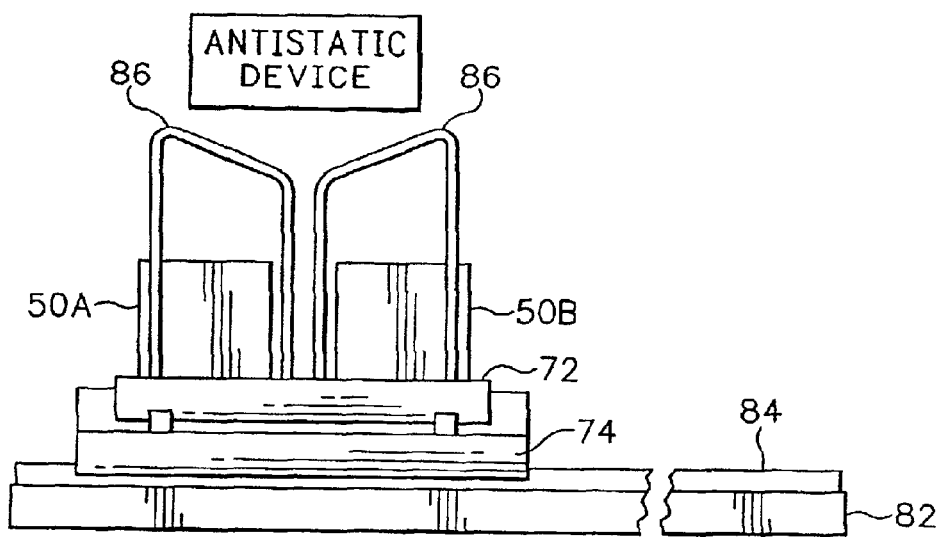
FIG. 1C is a view in the direction of the arrow C shown in FIG. 1B, FIGS. 2, 3A and 4A are views similar to FIG. 1 showing the apparatus at later stages in operation.

In the initial condition of the apparatus, which is shown in FIG. 1, the stripper jaws are open, the control switch is open, the insert clamp 46 and the pull clamp 50 are at the ends of their respective ranges of travel in the upstream direction and are both open, and the fiber aligner is in the upwardly tilted extraction position: A reel of test fiber having a loose end segment projecting therefrom is positioned in a test position such that the loose end segment of the test fiber lies along the axis 10 with the end face of the test fiber somewhat beyond the pull clamp 50. The reel may be placed in the test position manually, but it is preferred that a robot be used to manipulate the reel so that the loose end segment is passively guided into the apparatus. Specifically, the robot may move the reel relative to the illustrated apparatus to its test position along a path such that the loose end segment of the fiber is positioned vertically above its intended final position and then moves vertically downwards towards the clamps. However, the fiber is very limber and may be deflected from its intended trajectory, for example by forces due to electrostatic charge. The sloping rails of the fiber guides 86 guide the loose end segment into position between the jaws of the respective clamps as the reel moves to its test position, so that the loose end segment is reliably placed between the jaws of the clamps. There is a possibility that when the jaws open after the test is completed, the fiber segment will tend to adhere to one of the jaws. Since the jaws move outwards beyond the inner legs of the guide elements (see FIG. 1C), the loose end segment is positively detached from the jaws.

Even though the sloping rails of the fiber guides 86 are effective to guide the loose end segment into position between the jaws, it may nevertheless be desirable to provide an antistatic device for removing electrostatic charge from the loose end segment of the fiber before the fiber under test is loaded into the clamps. By removing any residual static charge from the fiber, the fiber passes freely between the guide rails without adherence to the guide rails or clamps.

Several different types of antistatic devices have been used in manufacture of optical fiber. For example, electrical ionizing devices are used to remove electrostatic charge from optical fiber during fiber spool winding. On slower moving fiber operations, a radioactive device can effectively remove electrostatic charge. A radioactive device may be positioned so that the loose end segment of the fiber passes through the bipolar ion field as it moves towards the clamps.

The antistatic device is illustrated in FIG. 1C above the pull clamp 50. It will be appreciated that FIG. 1C shows the antistatic device purely schematically, and that in practice the antistatic device might not be located above the pull clamp.

When the loose end of the fiber segment has been placed in the apparatus, the pull clamp 50 is closed and the stripper jaws 18 are closed but the insert clamp 46 remains open. The V-shaped guides in the tips of the stripping blades guide the fiber into the respective notches 34 as the jaws 18 close and the fiber is held in the notches without applying substantial force to the cladding. The drive motor for the pull clamp lead screw mechanism is then actuated and the Z-axis stage 82 is driven to the right of FIG. 1. Movement of the Z-axis stage to the right of FIG. 1 is accompanied by movement of the X-axis stage 74 to the right of FIG. 1. As the X-axis stage 74 moves to the right of FIG. 1, it urges the clamp 50 to the right of FIG. 1 against resistance due to tension in the fiber segment. The beam 78 is deflected by an amount that depends on the tension in the fiber and the voltage of the strain gauge signal varies accordingly. In normal operation, the tension in the fiber is not so large as to prevent movement of the clamp 50 to the right of FIG. 1.

As the pull clamp 50 moves to the right of FIG. 1, the fiber is pulled through the stripper and the coating material is stripped from the cladding, creating a stripped length segment of fiber. As will be described below, the stripped coating material is agitated by gas jets and removed from the stripper jaws by vacuum.

When the pull clamp has advanced slightly more than the distance L1 from the initial position, the controller causes the control switch of the arc cleaner to close and the voltage source is thereby connected to the electrodes 42 and an electric field is created between the electrodes. The electric field ionizes the air between the electrodes and creates a plasma. The ions of the plasma impinge on objects in the plasma, thereby heating the objects. The current supplied to the arc is high enough that the arc will heat small particles of coating material to vaporization, leaving the cladding in pristine condition. The current is not so high as to fuse or otherwise damage the fiber itself. Further, the plasma neutralizes electrostatic charge on the surface of the cladding. Since the control switch does not close until the pull clamp has advanced by more than the distance L1 from the initial position, the downstream end of the stripped length segment is downstream of the electrodes before the control switch is closed.

When the pull clamp 50 has advanced by a further distance L2, so that the total distance is L1+L2, the controller causes the control switch of the arc cleaner to open. The arc is extinguished. In addition, the stripping jaws 18 are separated. Stripping ceases and the stripper 14 releases the fiber. The upstream end of the stripped length segment is upstream of the electrodes. Accordingly, the timing of the closing and opening of the control switch is such that the switch is closed only while the 1stripped length segment of fiber is between the electrodes. The control switch is not closed while the coated fiber is between the electrodes.

The pull clamp continues to move to the right of FIG. 1 until it attains a position in which the stripped length segment of fiber is downstream of the insert clamp 46 and the stripped and cleaned segment, which is of length L2, is at the cleaving station. The insert clamp grips the coated, i.e. unstripped, fiber and the pull clamp opens and releases the fiber. The pull clamp is then repositioned by moving it a short distance in the upstream direction. The pull clamp closes again and the drive motor drives the lead screw to urge the pull clamp in the downstream direction. Since the fiber is gripped by the insert clamp, movement of the pull clamp in the downstream direction is resisted by tension in the fiber and the voltage of the strain gauge signal will increase as the tension in the fiber segment increases. When the voltage reaches the strain gauge set point value, the controller 12 outputs a signal to actuate the cleaver. In response to this signal, the cleaver, which may be of conventional form, is advanced towards the stripped fiber segment. The cleaver includes a cleaving blade 66 that is vibrated acoustically. When the cleaving blade touches the stripped fiber, the vibration of the cleaving blade applies additional stress to the fiber and induces a fracture that propagates across the fiber, thereby cleaving it and creating a freshly cleaved end face at a precisely controlled distance from the insert clamp. See FIG. 2. The use of a tensioned fiber cleave, in conjunction with an acoustically vibrating blade (U.S. Pat. No. 4,790,465), makes it possible to cleave the fiber without touching the cleaned segment of the fiber, which is advantageous because it avoids contamination and facilitates the subsequent alignment operation.

Since the fiber aligner is in the extraction position, the port 62 is at the level of the fiber axis and the control valve is open. The pull clamp 50 is opened, releasing the severed end segment of the fiber, and the severed end segment is removed with the flow of air induced into the port 62. The fiber aligner is then pivoted to its alignment position and the control valve is closed.

Figure 2:
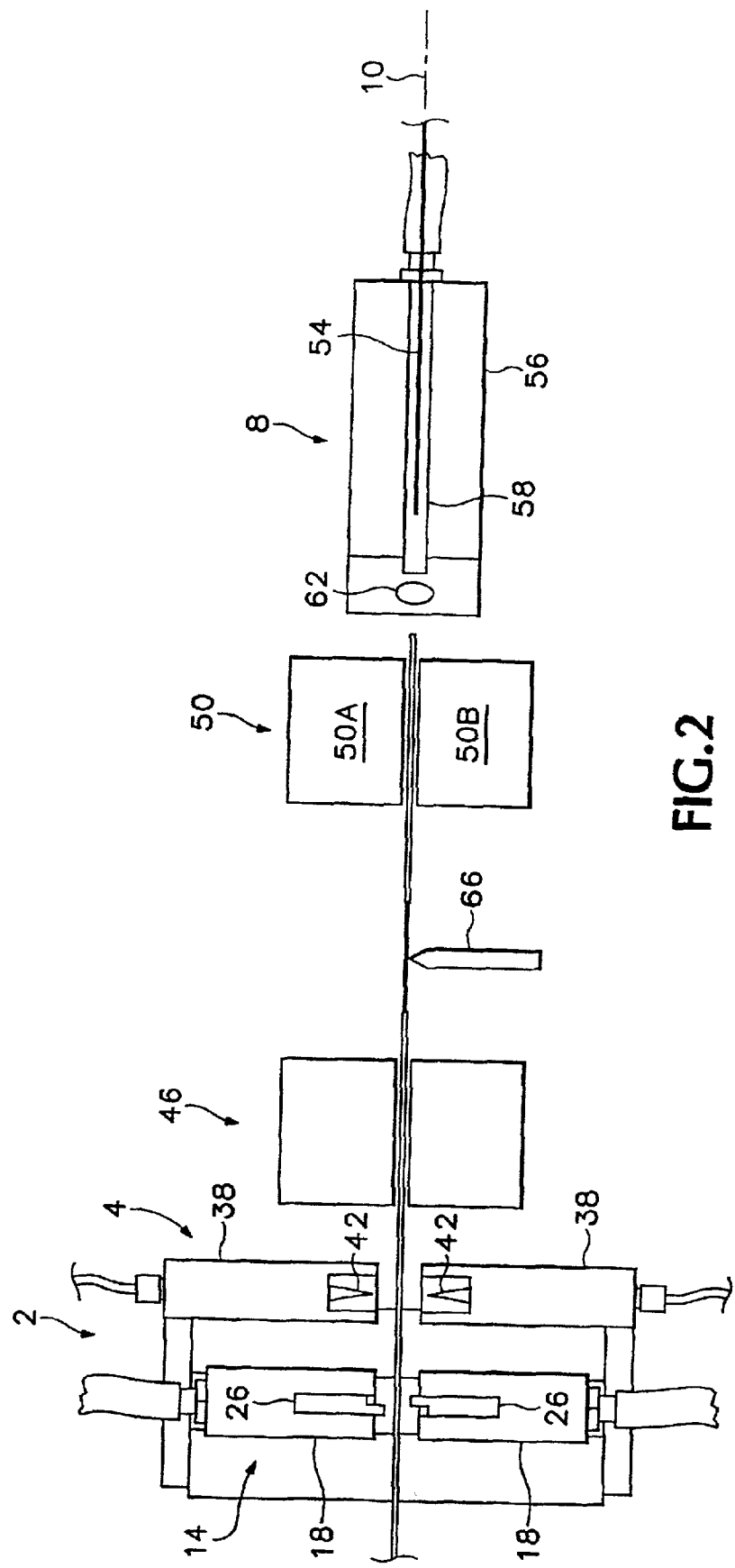

The pull clamp 50 is then moved aside (to the right when looking in the downstream direction) and the insert clamp 46 is driven to the right of FIG. 2 (in the downstream direction), with the freshly cleaved end of the fiber projecting from the jaws of the insert clamp. See FIGS. 3A and 3B. Because the position of the cleaver relative to the insert clamp is precisely controlled, the length of fiber projecting from the insert clamp is precisely controlled. Movement of the insert clamp to the right of FIG. 2 advances the freshly cleaved end of the fiber into the groove 58 in the fiber aligner. The cleaved end face of the fiber is thereby optically coupled to the buffer fiber. A drop 68 of index matching oil is used to improve coupling between the test fiber and the buffer fiber. The test fiber is then tested using the test instrument. After the test is complete, a chopping blade 70 cuts the fiber on the upstream side of the insert clamp, approximately at the same location as the cleaver. The reel of test fiber is removed from the apparatus, allowing the loose end segment of another reel of test fiber to be placed in the apparatus. The location of the chopping blade 70 determines the length of the loose end segment of fiber when the reel of test fiber is removed from the apparatus. By cutting the fiber upstream of the stripped end segment after the fiber has been tested, the reel of test fiber is not contaminated by the index matching oil.

The single fiber aligner pivots back to its extraction position and the control valve opens. The insert clamp 46 then opens, releasing the severed end segment of the fiber and the severed end segment is removed through the port 62. The insert clamp is then returned to its start position, the pull clamp 50 is driven on the X-axis stage 74 to its on axis position, and the lead screw mechanism drives the Z-axis stage 82 to return the pull clamp to its start position. The apparatus is ready to receive another reel of test fiber.

It was previously mentioned that in use of the conventional stripper in the conventional manner, the stripping blades are closed onto the fiber a short distance from the end face and the fiber is pulled through the stripper so that the stripper passes along the fiber in the direction towards the end face of the fiber. Since the initial position of the stripping blades is close to the end face in this case, no significant quantity of coating material is able to build up on the upstream side of the stripping blades before the stripping is complete. In the case of the illustrated apparatus, a medial segment of the fiber is stripped and therefore clumps of cladding material tend to accumulate upstream of the stripping blades, between the stripping blades and upstream coating material that has not been stripped. Such build up of coating material may increase the resistance to movement of the fiber through the stripper and result in excessive tension being applied to the fiber. Further, when the stripping blades open, there is a possibility of particles that adhere to the stripped segment of fiber being carried on the fiber downstream of the stripping blades. There is also a possibility that a particle will adhere to one of the blades; when the blades subsequently close, such a particle may be trapped between the blade and the exterior surface of the fiber, with the result that a peripheral stress is applied to the fiber, possibly resulting in damage to the fiber. It is therefore extremely important to ensure that particles of coating material are efficiently removed from the stripping zone and do not form clumps adhering to the cladding, and that coating material particles do not adhere to the stripping blades and that large particles are not carried from the stripping zone with the fiber.

Referring to FIGS. 5–9, each stripper jaw defines a channel 100 into which the stripping blade 26 projects. Each blade is located in a duct segment 108 that extends perpendicular to the axis 10 and is divided by the blade into two passages 110. When the stripper jaws are closed, the two channels 100 combine to form a passage 104 through which the fiber extends and the two duct segments 108 form a duct 114 that intersects the passage 104. The two opposite ends of the duct 114 are connected respectively to a source of compressed air for supplying compressed air to the fiber passage 104 and to a vacuum source for exhausting air from the fiber passage 104. Accordingly, a vigorous flow of air is induced in the passages 110 during the stripping operation. This vigorous air flow disturbs the particles and conglomerations as they are formed by the stripping blades and dislodges them from the fiber, leaving only very small particles adhering to the fiber cladding. The particles of coating material are entrained in the air flow and are efficiently removed from the vicinity of the stripping blades as the fiber is drawn through the stripper so that there is no build up of clumps of coating material on the upstream side of the stripping blades.

The level of vacuum is such as to maintain a negative pressure in the fiber passage 104 when the jaws are closed. Accordingly, air flows into the fiber passage 104 from the downstream side of the stripper. Although the pressure and vacuum levels are selected to provide a high cleaning flow through the passages 110, they are balanced so that the air flow into the fiber passage 104 from the downstream side of the stripper is small enough not to disturb the electrical arc from the fiber axis.

Against the possibility of particles adhering to the blades in the vicinity of the notches, the blades are closed and opened several times after a test fiber has been removed from the apparatus and before a new test fiber is placed in the apparatus to ensure that any particles adhering to the blades are dislodged and removed by the air flows induced in the fiber passage.

The strain gauge signal is continuously monitored by the controller and variation in the voltage of the strain gauge signal provides a useful tool for identifying and diagnosing problems in operation of the apparatus. For example, in the event that the stripping blades were worn, the variation in voltage of the strain gauge signal with the position of the pull clamp during the stripping operation would be different from the variation that would be observed if the stripping blades were in good condition, and this difference can be used by the controller to provide a warning signal that the stripping blades should be replaced. In addition, if the pull clamp 50 or insert clamp 46 does not grip the fiber firmly, so that there is slippage of the fiber relative to one of the clamps, the variation in voltage of the strain gauge signal during the tensioning operation is different from that which would occur if the fiber segment were gripped firmly by both clamps, and this difference can be used by the controller to provide a signal that warns of possible malfunction. Indeed, it would be possible, and perhaps desirable, to define an envelope between maximum and minimum functions for the strain gauge signal for each phase of operation of the apparatus and to provide a warning signal in the event that the voltage of the strain gauge signal at a particular phase of operation swings outside the envelope of acceptable values for that phase.

The strain gauge signal may also be used to monitor operating characteristics and fiber characteristics. With respect to operating characteristics, the waveform of the strain gauge signal has a characteristic shape from which it is possible to infer the evolution of the operation of the apparatus as a function of time. For example, it is possible to infer from the waveform of the strain gauge signal when the stripper starts operating and when the stripper stops operating, and it is therefore possible to calculate the time for which the stripper operates. This information may be used to compare operation of the strippers of two or more units of the apparatus, so that the strippers may then be adjusted to achieve uniform operation across the several units. This may be desirable when the several units are operating side-by-side in a production environment.

With respect to fiber characteristics, it is possible to derive information regarding the strength of adhesion of the coating to the cladding from the shape of the waveform of the strain gauge signal. This information may be used by a fiber manufacturer to identify and correct manufacturing problems.

Other mechanisms are available for tensioning the test fiber prior to cleaving. For example, in accordance with one possibility, a compression spring effective between the pull base and the X-axis stage urges the pull clamp in the downstream direction relative to the X-axis stage and a pneumatic cylinder is operated selectively to either force the pull clamp in the upstream direction against the force of the compression spring or allow the compression spring to urge the pull clamp in the downstream direction. While the pull clamp is in its open state immediately prior to cleaving, the pneumatic cylinder is pressurized and thereby forces the pull clamp in the upstream direction, compressing the spring. After the pull clamp closes and grips the fiber, the pneumatic cylinder is vented. The compression spring urges the pull clamp in the downstream direction and imposes a controlled tension on the length segment of fiber between the pull clamp and the insert clamp.

Although this pneumatic cylinder and compression spring mechanism is effective for tensioning the length segment of fiber, the use of the strain gauge mechanism described above is preferred over the pneumatic cylinder and compression spring mechanism because it avoids certain limitations that are inherent in the latter technique. For example, the tension in the spring is not equal to the tension in the fiber segment because some of the tension in the spring is taken up in overcoming frictional resistance between the base and the X-axis stage. Further, the spring does not provide any protection against slippage in the clamps. Moreover, the spring constant may change with age, necessitating either that the spring be changed or that the extension of the spring be adjusted in order to keep the tension constant, whereas the strain gauge is less subject to aging. In addition, by adjusting the set point value for the strain gauge signal, the tension at which the controller provides the cleave actuation signal can be adjusted to accommodate requirements for different types of fiber.

In the apparatus illustrated in the drawings, the components that implement the various stations of the apparatus are mounted in a frame and the stripper is at a fixed position along the Z-axis relative to the frame; and the test fiber is stripped by pulling the fiber through the stripper while unreeling fiber from a reel. In a modification of the apparatus and method described above, the stripper is moveable along the Z-axis relative to the frame and the test fiber is stripped by holding the fiber stationary relative to the frame as the stripper is moved along the Z-axis. This modification is useful in the case where the test fiber is relatively short, for example in the event that the test fiber is in the form of a pigtail attached to a photodiode or other optical component.

It will be appreciated that the invention is not restricted to the particular embodiments that have been described, and that variations may be made therein without departing from the scope of the invention as defined in the appended claims and equivalents thereof. Specifically, it should be appreciated that the invention may be used to align pristine prepared fiber ends to bulk optical systems for subsequent measurements, or could be used in the preparation of fiber ends that are to be fusion spliced, either for measurement purposes or for permanent coupling. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. A reference in a claim to a length segment of fiber passing through a station is not intended to be construed as limiting the claim to the case in which the length segment of fiber moves through a station that remains stationary but is intended to cover also the case in which the station moves and the length segment of fiber remains stationary.

What is claimed is:

1. A method of preparing a coated optical fiber for coupling to a face of an optical device, comprising:
   (a) placing the coated fiber so that it extends through a stripping station, a cleaning station and a cleaving station,
   (b) bringing a stripper at the stripping station into engagement with the fiber,
   (c) effecting relative motion between the fiber and the stripping station, the cleaning station and the cleaving station lengthwise of the fiber, whereby the coating is stripped from a medial length segment of the fiber as maid medial length segment passes through the stripping station,
   (d) activating a cleaning device at the cleaning station and thereby cleaning fragments of coating material from said medial length segment of the fiber as said medial length segment passes through the cleaning station.
   (e) deactivating the cleaning device and discontinuing stripping,
   (f) positioning the fiber with said medial length segment of fiber at the cleaving station, and
   (g) cleaving the fiber within said medial length segment, thereby providing the fiber with a freshly cleaved end region.

2. A method according to claim 1, wherein the step of activating the cleaning device includes creating an electric arc in the vicinity of the fiber.

3. A method according to claim 1, comprising inducing a flow of gas at the stripping station, whereby coating material that is stripped from the fiber as the fiber passes through the stripping station is entrained in the flow of gas and removed from the fiber.

4. A method according to claim 1, further comprising removing the optical fiber so that it no longer extends through the stripping station, the cleaning station and the cleaving station, placing a second coated fiber so that it extends through the stripping station, the cleaning station and the cleaving station, and repeating steps (b)–(g).

5. A method according to claim 1, comprising removing electrostatic charge from at least the free end region of the coated fiber.

6. A method according to claim 1, comprising, before step (a) removing electrostatic charge from at least the free end region of the coated fiber.

7. A method according to claim 1, further comprising:
   (h) cleaving the fiber within said medial length segment, thereby providing the fiber with a freshly cleaved end region, and
   (i) coupling the freshly cleaved end region of the fiber to a test station.

8. A method according to claim 7, further comprising coupling the fiber to the face of the optical device at the test station, and testing the fiber using the optical device.

9. A method according to claim 7, wherein step (i) includes gripping the fiber upstream of said medial length segment using a clamp and advancing the clamp in the downstream direction and thereby advancing the freshly cleaved end region to the teat station, and the method further comprises cutting the fiber upstream of the clamp, releasing the cut end segment of the fiber from the clamp end removing the cut end segment.

10. A method according to claim 7, wherein the coated optical fiber is a test fiber, the optical device is a buffer fiber connected to a test instrument, step (i) includes bringing the freshly cleaved end of the test fiber into alignment with an end region of the buffer fiber, and the method further comprises testing the test fiber using the test instrument.

11. A method according to claim 1, wherein step (c) comprises applying tension to the free end region of the fiber and thereby pulling the fiber through the stripping station, the cleaning station end the cleaving station.

12. A method according to claim 11, comprising gripping the free and region of the fiber and developing an electrical signal representative of tension in the fiber upstream of the location at which the fiber is gripped.

13. A method according to claim 11, wherein step (f) comprises continuing to pull the fiber until said medial length segment of fiber is at the cleaving station.

14. A method according to claim 1, further comprising:
(b) cleaving the fiber within said medial length segment, thereby providing the fiber with a freshly cleaved end region.

15. A method according to claim 14, comprising applying tension to the free end region of the fiber between steps (g) and (h), and wherein step (h) comprises cleaving the fiber while the free end region of the fiber is under tension.

16. Apparatus for preparing a coated optical fiber for coupling to a face of an optical device, said apparatus comprising:

a stripper at a stripping station, a cleaner at a cleaning station, a cleaver at a cleaving station, at least one clamp for selectively gripping a free end region of a fiber that extends though the stripping station, the cleaning station and the cleaving station, and a control means for controlling the apparatus to perform the following operations:

activate the clamp to grip the free end region of the fiber, activate the stripper to engage the fiber, move the clamp in a direction to apply tension to the fiber to pull the fiber through the stripping station and strip coating material from a medial length segment of the fiber, activate the cleaning device and thereby clean fragments of coating material from said medial length segment of the fiber as said medial length segment pauses through the cleaning station, deactivate the cleaning device, continue to move the clamp in said direction until said medial length segment or fiber is at the cleaving station, apply tension to the medial length segment of the fiber, while the medial length segment of the fiber is under tension, cleaving the fiber within said medial length segment, thereby providing the fiber with a freshly cleaved end region, and move the clamp in said direction to advance the freshly cleaved end region of the fiber to a coupling station.

17. A method according to claim 1, wherein step (c) comprises effecting said relative motion under control of an electrical signal and step (g) comprises cleaving the fiber under control of an electrical signal.

* * * * *

UNITED STATES PATENT AND TRADEMARK OFFICE
CERTIFICATE OF CORRECTION

PATENT NO. : 6,904,226 B2
DATED : June 7, 2005
INVENTOR(S) : David A. Kritler et al.

It is certified that error appears in the above-identified patent and that said Letters Patent is hereby corrected as shown below:

<u>Column 12,</u>
Line 5, "maid" should be deleted and replaced with -- said --.
Line 53, "clamp end" should be deleted and replaced with -- clamp and --.
Line 64, "end" should be deleted and replaced with -- and --.
Line 66, "and" should be deleted and replaced with -- end --.

Signed and Sealed this

Ninth Day of August, 2005

JON W. DUDAS
*Director of the United States Patent and Trademark Office*